Patented Mar. 11, 1941

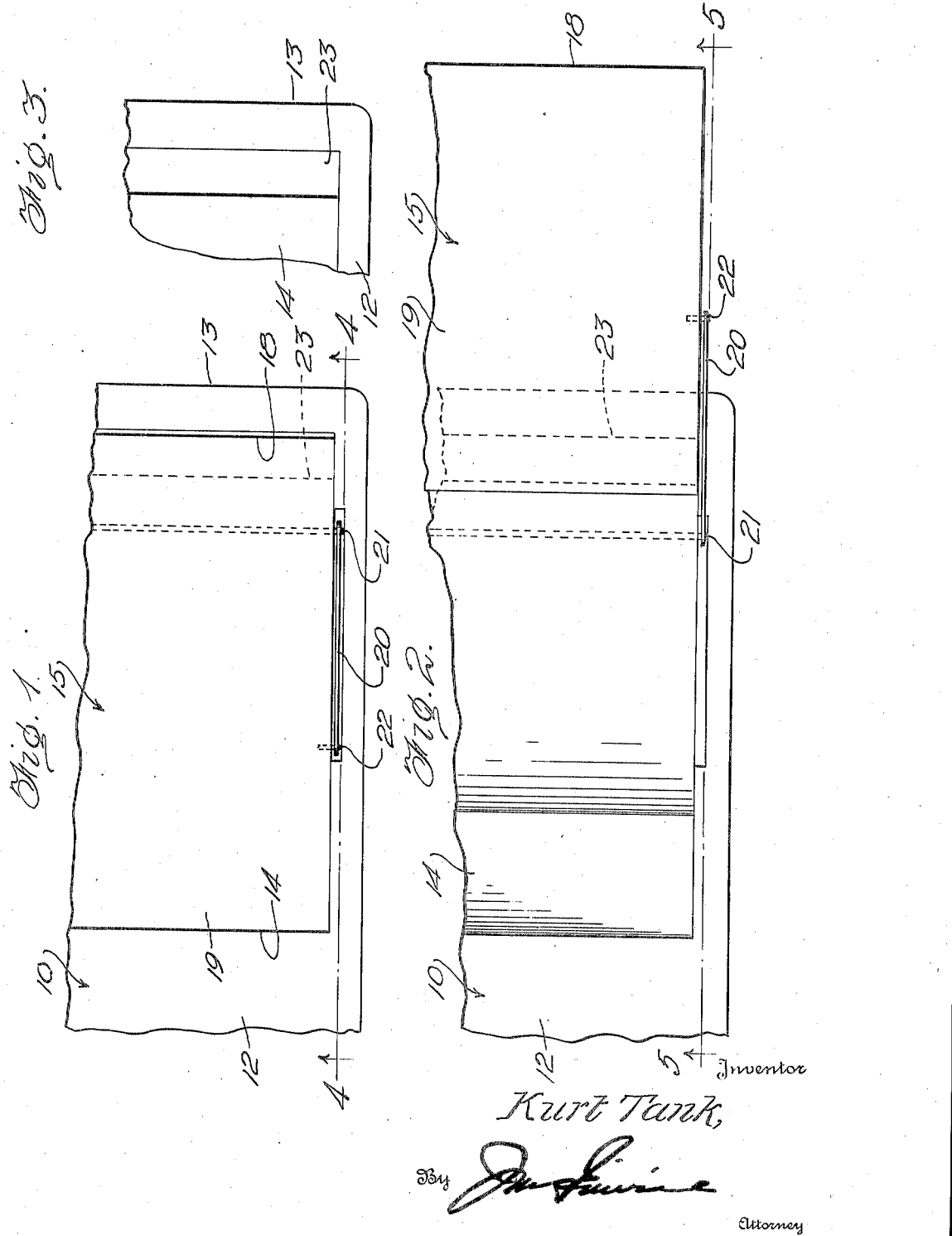

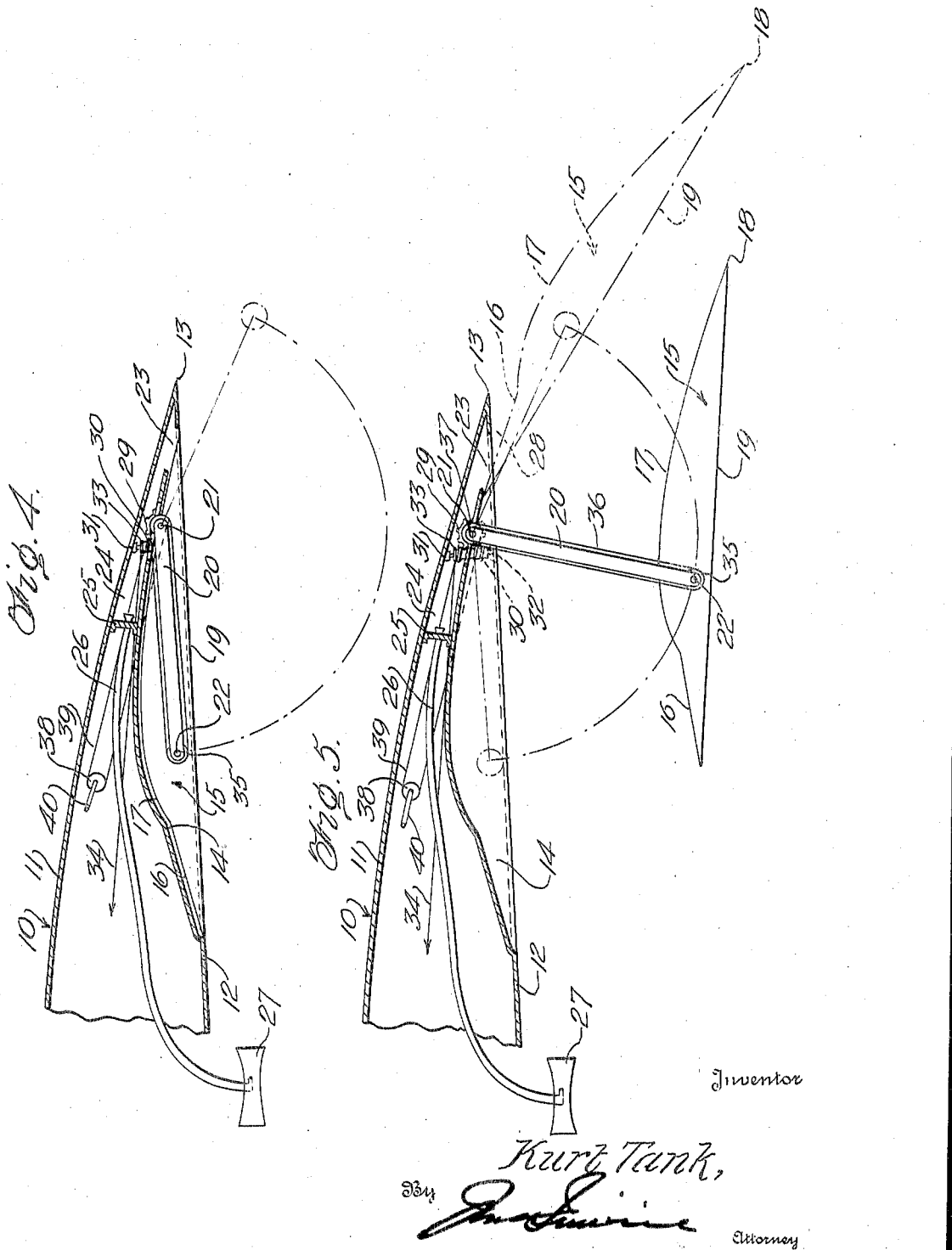

2,234,883

UNITED STATES PATENT OFFICE 2,234,883

AIRPLANE

Kurt Tank, Bremen, Germany, assignor to Focke-Wulf Flugzeugbau G. m. b. H., Bremen-Flughafen, Germany Application October 5, 1939, Serial No. 298,131
In Germany October 7, 1938

2 Claims. (Cl. 244—42)

This invention relates to airplanes and has special reference to auxiliary or extension wings for airplanes.

More particularly the invention relates to auxiliary wings adapted to extend rearwardly from the trailing edges of the main wings or aerofoils.

Heretofore, it has been customary, when such auxiliary wings were used, to provide an air flow space between the trailing edge of the main wing and the leading edge of the auxiliary wing to prevent interruption of stream line air flow over the upper surfaces of the main and auxiliary wings due to the formation of eddy currents at the trailing edge of the main wing. The provision of such an air gap is satisfactory in those cases in which the angle of attack of the auxiliary wing approximates the angle of attack of the main wing, but in modern aircraft with greater loads and higher landing speeds than formerly, it has become necessary in many cases to use an angle of attack for the auxiliary wing considerably greater than that of the main wing, so that a considerable angularity exists between the upper surfaces of the main and auxiliary wings when the latter are extended. In such cases, the customary air gap is found insufficient to prevent the formation of eddy currents interfering with the stream line air flow.

One important object of the present invention is to provide an improved means for preventing the formation of eddy currents at the trailing edge of the main wing while the auxiliary wings are extended.

A second important object of the invention is to provide a novel arrangement of suction openings and devices in the main wings for preventing such eddy currents.

A third important object of the invention is to provide a novel arrangement of auxiliary wing for controlling air flow through such openings.

A fourth important object of the invention is to provide a novel arrangement of auxiliary wing wherein the leading edge of such wing is, when extended, overlapped by the trailing edge of the main wing.

A fifth important object of the invention is to provide a novel arrangement of main and auxiliary wings, wherein the auxiliary wing is housed in the underside of the main wing when not in use, and wherein means are provided for moving the auxiliary wing into extended position, such means being further arranged to effect angular adjustment of the auxiliary wing to vary the angle of attack as desired.

With the above and other objects in view, as will be presently understood, the invention consists in general of certain novel details of construction and combinations of parts hereinafter fully described, illustrated in the accompanying drawings, and particularly pointed out in the appended claims.

In the accompanying drawings, like characters of reference indicate like parts in the several views, and—

Figure 1 is a bottom plan view of an airplane wing with an auxiliary wing in housed relation therein as constructed in accordance with this invention.

Figure 2 is a similar view but showing the auxiliary wing extended.

Figure 3 is a bottom plan view of a portion of a main wing with the auxiliary wing removed to better show the suction openings.

Figure 4 is a section on the line 4—4 of Figure 1.

Figure 5 is a section on the line 5—5 of Figure 2.

In the form of the invention here disclosed, there is illustrated a main airplane wing 10 of any preferred stream line cross section. This wing is provided with an upper surface 11 and a lower surface 12, and has its trailing edge indicated at 13. In the underside of the wing 10, there is formed a convex pocket 14 for the reception of an auxiliary wing, indicated in general at 15. The pocket 14 has its rear edge close to but spaced slightly from the trailing edge 13. The auxiliary wing has an upper side having its forward portion 16 constituting a plane surface and its rear portion 17 curved to form a stream line surface terminating forwardly at the rear edge of the plane portion 16 and rearwardly at the trailing edge 18. The under surface 19 of the wing 15 is comparatively flat to lie, with the wing housed, flush with the under surface 12 of the main wing 10 and forms a smooth and unbroken continuation of such under surface 12, as can be seen by reference to Figure 4.

At each side of the wing 15 there is provided an arm 20, which is pivoted at 21 to the main wing 10, adjacent the trailing edge 13. These arms are also pivoted to the auxiliary wing 15 at 22, the point 22 being preferably at the aerodynamic center of the wing 15. As shown in Figures 4 and 5, these arms support the wing from movement between housed and extended positions, and the pivotal connection at 22 permits angular variation in the position of the wing 15, so that it may be caused to have a desired angle of attack. The means for swinging the arms 20 and for adjusting the angle of attack will be hereinafter described.

It will be seen from Figure 5, that the trailing edge 13 of the wing 10 overlaps the plane upper surface 16 of the wing 15. In the overlapping portion of the under surface 12 of the wing 10, there are provided openings 23 located at the rear edge portion of the pocket. These openings lead into a chamber 24 formed in the rear part of the wing 10 by a partition 25 extending between the upper and lower surfaces 11 and 12 of the wing 10. Through the partition 25 extends a tube 26, which has one end open to the chamber 24 and its other end connected with a suction producing device of any suitable character, and here indicated in general by the Venturi device 27.

As shown in Figure 4, the trailing edge portion of the wing 15 closes the openings 25 upon housing of the wing. However, when the wing is extended rearwardly, as in Figure 5, the leading edge contacts the inside of the pocket just forwardly of the openings 23 and the surface 16 inclines rearwardly and downwardly to form a wedge-shaped passage 28, through which air is induced to flow by the partial vacuum in the chamber 24, and this effectually breaks up the eddy currents formed at this point, thus permitting stream line air flow over the upper surface of the wing 15 with corresponding increase in efficiency of the auxiliary wing.

In order to operate the auxiliary wing 15, the pivot 21 may be in the form of a shaft extending transversely of the airplane and having the arms 20 fixed thereon. On the shaft 21 is also fixed a worm wheel 29, wherewith meshes a worm 30, suitably journalled as at 31 and 32. Fixed to the worm 30 is a pulley 33, around which extends a belt or wire 34, which passes to any common operating means (not shown) suitably positioned in the airplane. By actuating the belt or wire 34, the worm 30 is rotated and this causes rotation of the wheel 29 and shaft 21 so that the arms 20 are swung to house or extend the auxiliary wing 15.

To vary the angle of attack or pitch of the auxiliary wing 15, the pivot 22 may be fixed to the wing and journalled in the free end of the arm 20. On the pivot 22 is fixed a pulley 35 which is connected by a belt 36 with a double pulley 37 rotatably mounted on the shaft 21. A crank provided pulley 38 is suitably mounted in the airplane and is connected by a belt 39 with the double pulley 37. By operating the crank 40 of the pulley 38, the latter is rotated and in turn causes rotation of the pulleys 37 and 35 so that the wing 15 may be tilted to any desired position.

What I claim is:

1. In an aircraft, a main wing having a trailing edge portion and provided with a pocket in its under side adjacent said trailing edge, an auxiliary wing normally fitting in said pocket, and means to move the auxiliary wing from the pocket to a position rearwardly of the trailing edge of the main wing, the leading edge portion of the auxiliary wing fitting beneath the trailing edge portion of the main wing to afford a common uninterrupted profile with the main wing without disturbing the air flow over the wings, and means for creating a suction effect in the main wing to remove the boundary layer at the suction side of this uninterrupted profile.

2. A construction as defined in claim 1 wherein the pocket in the under side of the main wing and the shape and size of the auxiliary wing are in such correlation that the surface boundary of the auxiliary wing registers smoothly and flush against the under surface of the main wing.

KURT TANK.